May 5, 1959

A. O. SCHMIDT 2,884,838

LUBRICANT DISTRIBUTOR

Filed July 10, 1957

INVENTOR.
Alfred O. Schmidt
BY
Elroy J. Wutschel
Attorney

United States Patent Office 2,884,838
Patented May 5, 1959

2,884,838

LUBRICANT DISTRIBUTOR

Alfred O. Schmidt, Elm Grove, Wis., assignor to Kearney & Trecker Corporation, West Allis, Wis., a corporation of Wisconsin Application July 10, 1957, Serial No. 670,932

10 Claims. (Cl. 90—11)

This invention relates to an improved lubricating system for distributing lubricating oil to frictionally engaged bearing surfaces carried for relative movement in mechanical structures.

Heretofore, it has been customary to employ felt pads or wicks for distributing lubricating oil to the cooperating frictionally engaged bearing surfaces of mechanical structures. The usual arrangement includes a resilient pad frictionally engaging a partially exposed bearing surface adjacent its area of engagement with a cooperating bearing surface. Lubricant from a convenient source was connected to thoroughly saturate the pad. When newly placed in position, the pad is so saturated with lubricant as to distribute it uniformly along the associated frictionally engaged bearing surface. This arrangement operates to supply ample lubricant to the cooperating bearing surfaces as long as the pad retains its resilience and has not become permeated with external contaminants. In some of these applications, it is virtually impossible to fully shield the pad against foreign contaminants, particularly in the case of a contaminant that comprises, or is suspended, in an aqueous solution. A contaminating aqueous solution completely permeating the felt pad results in a gradual deterioration of the pad and possible damage to the bearing surfaces being lubricated. First, the fibers of the pad, as well as the interstices therein, become clogged to the point that insufficient lubricant is supplied to the bearing surfaces and scoring results. Second, the pad loses its resilience and becomes sufficiently hard to score that portion of the exposed bearing surface which it frictionally engages. In the latter case, the condition becomes further aggravated in the event minute metallic fragments are suspended in the contaminating aqueous solution, and become embedded in the surface of the pad as it hardens. In all of these cases, deterioration of the lubricating pads is not apparent upon visual inspection and, consequently, is not detected until after the bearing surfaces have been damaged. It will be apparent that such damage may be extremely expensive, due both to the necessary repairs to the bearing surfaces and to the inoperability of the mechanism while repairs are being effected.

A general object of the invention is to provide an improved lubricating system for cooperating, frictionally engaged bearing surfaces.

Another object is to provide an improved fibrous lubricating pad that operates to distribute lubricant on a frictionally engaged bearing surface.

Another object is to provide an improved fibrous lubricating pad that operates to distribute lubricating oil irrespective of the presence of foreign contaminants, such as aqueous solutions.

Another object is to provide, in combination with mechanical structure having cooperating bearing surfaces, an improved lubricating oil distributing system.

Another object is to provide an improved fibrous lubricating pad that is so treated as to preclude damage to a cooperating, frictionally engaged bearing surface.

Another object is to provide an improved fibrous lubricating pad for slidably engaged bearing surfaces in mechanical structure, and that functions with unimpaired utility in the presence of unavoidable aqueous solutions.

Another object is to provide an improved lubricating pad connected to distribute lubricating oil along a frictionally engaged bearing way surface.

A further object of the invention is to provide an improved fibrous lubricating pad for a journal box such as those employed for lubricating the wheel bearings of railway cars.

A still further object is to provide in combination with the cooperating bearing surfaces of mechanical structure, an improved lubricating pad that will absorb oil and repel contaminating aqueous solutions.

A still further object of the invention is to provide an improved silicone impregnated fibrous lubricating pad that repels aqueous solutions and absorbs oil.

According to this invention, the cooperating frictionally engaged bearing surfaces incorporated in mechanical structure are provided with an improved lubricant supply system. To this end, a partially exposed portion of one of the frictionally engaged bearing surfaces is frictionally engaged by an oil impregnated felt pad or wick. A source of lubricating oil is connected to transmit lubricant to saturate the pad which, in turn, distributes the oil uniformly along the frictionally engaged bearing surface. Lubricant distributed in this manner is caused to flow between the cooperating bearing surfaces upon relative movement therebetween. To preclude damage to the bearing surfaces, the pad is chemically treated, preferably with a solution of silicones, before being placed in its operative lubricant distributing position. Chemical treatment is effected by completely immersing the felt pad or wick in a silicone solution until all of the fibers thereof are completely impregnated, and then air drying the treated pad. Upon being placed in its operative lubricant distributing position, the chemically treated pad operates to absorb lubricating oil, and to repel any contaminating aqueous solutions that may be present. Thus, the treated felt pad lubricates the associated frictionally engaged bearing surface with no appreciable loss in resiliency, and no tendency to clog and interfere with the required oil distribution. Damage to the cooperating, relatively movable bearing surfaces is thereby prevented both by maintaining a sufficiency of lubricating oil, and by obviating any tendency to score the bearing surface by premature hardening of the oil distributing pad.

The foregoing and other objects of this invention, which will become more fully apparent from the following detailed specification, may be achieved by the particular apparatus that is depicted in, and described in connection with the accompanying drawings in which.

Figure 1:
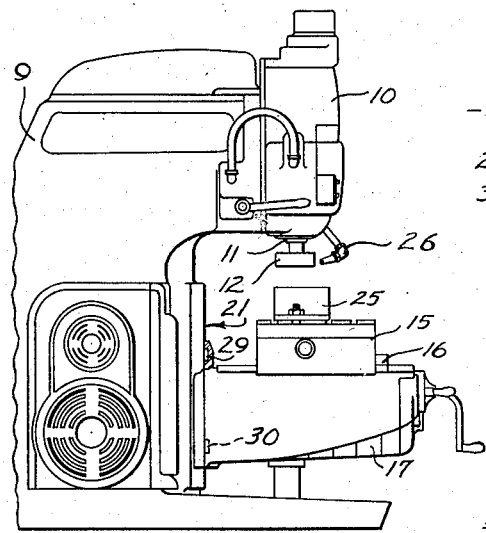
Figure 1 is a fragmentary view in side elevation of a milling machine, in which the invention can be utilized to advantage, and with parts of the machine broken away.

Referring specifically to the drawings, and particularly to Fig. 1, the machine tool there shown incorporates a preferred form of the improved lubricant distributor. As shown in Fig. 1, the machine comprises a vertically upstanding column 9 carrying at its upper forward portion a vertically movable spindle head 10. A vertical power driven tool spindle 11 journalled in the head 10 is adapted to carry a milling cutter, such as the cutter 12 shown in Fig. 1. A plurality of slidably superimposed work supports are operatively disposed beneath the tool spindle. These include a longitudinally movable worktable 15 slidably carried by a saddle 16, that is slidably mounted upon a knee 17 for movement toward and away from the front face of the column 9. The knee 17 is provided with way surfaces 18 and 19 disposed to slidably engage complementary vertical way surfaces 21 and 22 presented by the column 9. Suitable sources of power (not shown) are connected in well known manner to drive the tool spindle 11, as well as to effect selective movement of the knee 17, saddle 16, and worktable 15.

Thus, a workpiece, such as the workpiece 25 secured to the table 15, may be moved into engagement with the rotating cutter 12 during a machining operation. For certain types of machining operations, it is necessary that a stream of aqueous cutting coolant be directed toward the cutter 12 as it engages the workpiece 25. To this end, a coolant outlet nozzle 26 adjustably secured to the spindle head 10 is connected to receive aqueous coolant under pressure from a power driven source (not shown). The arrangement for pumping the coolant, collecting the coolant after it has been flooded over the cutting tool and workpiece, and then recirculating it through the pumping system are well known in the art; and do not constitute a part of this invention.

During a machining operation, a certain amount of aqueous coolant from the nozzle 26 may be unavoidably sprayed over exposed portions of the machine. It is virtually impossible to fully shield the cooperating, frictionally engaged bearing or way surfaces respectively constituting the movable interconnection between the table 15, saddle 16, knee 17, and column 9. Thus, a certain small amount of coolant may be sprayed on one or more of the exposed way surfaces and seep between that surface and the cooperating way. Although less likely, this condition may even occur under certain conditions between the cooperatively engaged bearing way surfaces respectively presented by the upper portion of the column 9 and the vertically movable spindle head 10. Admission of aqueous coolant between any pair of cooperating bearing way surfaces may result in damage to the machine, and scoring of the cooperating way surfaces.

To preclude bearing way damage caused by unpreventable coolant seepage, the present invention provides an improved lubricant distributor that functions to distribute lubricating oil with unimpaired utility, even in the presence of contaminating aqueous coolant fluid. The improved lubricant distributor comprises a pair of felt wiper pads 29 and 30 treated to repel aqueous coolant, and carried in vertically spaced apart recesses 31 and 32 formed in the left rear knee way 18. In a similar manner, another pair of vertically spaced felt wiper pads are carried in the rear way surface of the right knee way 19, with only the upper pad 34 being shown in Fig. 2. All of the felt wiper pads are treated to repel aqueous coolant, and to receive lubricating oil from a common source. Lubricating oil is withdrawn from a sump in the knee 17 by means of a power driven pump 36, and directed through lines 38, 39 and 40. By means of this arrangement, the lines 38 and 39 are connected to saturate the left felt wiper pads 29 and 30 with lubricating oil. The line 40 is connected to supply lubricating oil to saturate the upper right felt wiper pad 34 and to the lower right wiper pad (not shown). Thus oil under slight pressure is forced from the felt pads between the cooperating left bearing way surfaces 18, 21 and the right way surfaces 19, 22. Likewise, whenever the knee 17 is moved vertically along the column 9, the felt pads operate to distribute oil along the frictionally engaged column bearing ways 21 and 22.

Before being placed in the operative lubricant distributing position shown in Fig. 1, the left felt pads 29, 30 as well as the upper right pad 34 and the lower right pad (not shown) are treated by being fully immersed in a solution of silicones until the pads are fully impregnated with the solution. A silicone solution of approximately fifty percent (50%) solids in perchlorethylene that is produced under the trade name of Dow Corning No. 1109 has been found most suitable for this purpose. To insure complete impregnation, it has been found preferable to immerse the pads for a minimum of one-half hour. After being immersed, the felt pads are removed from the silicone solution and dried thoroughly. The silicone treated felt wiper pads possess the characteristic of being saturatable with oil, and, at the same time, repelling contaminating solutions of aqueous coolant. Each silicone treated felt pad not only repels aqueous coolant from each fiber, but greatly reduces aqueous absorption in the interstices between the fibers. Further, the silicone treated felt pads retain their natural resilience over much longer periods of time. Since the felt wiper pads repel coolant, the pads do not harden, either due to aqueous coolant alone, or due to minute metallic fragments or dust that is suspended in the contaminating coolant.

Figure 3:
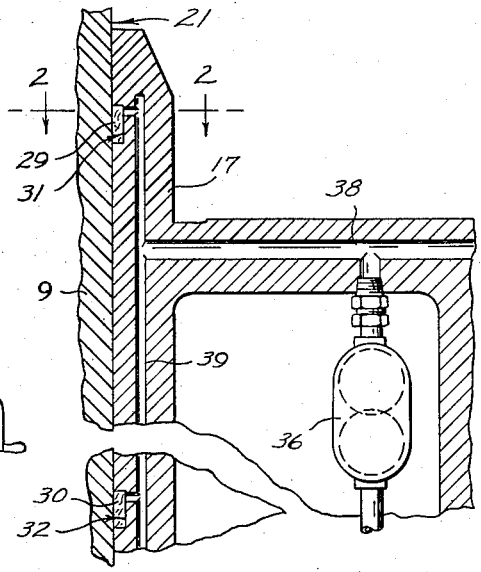
Fig. 3 is an enlarged view in vertical section through the cooperating column and knee ways.
Figure 2:
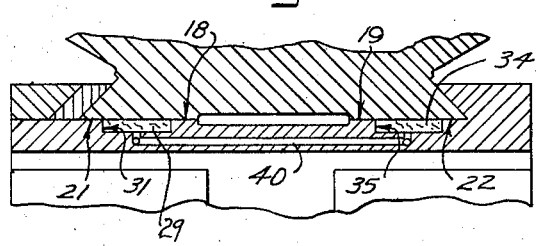
Fig. 2 is an enlarged fragmentary view in horizontal section through the front portion of the column and the cooperating rearward portion of the knee.

Thus, with the silicone treated felt wiper pads positioned within the knee, as shown in Figs. 1, 2 and 3, the cooperating bearing way surfaces respectively presented by the knee 17 and column 9 receive adequate lubrication whenever the pump 36 is operating. The treated left wiper pads 29, 30, as well as the upper right pad 34 and lower right pad (not shown) function to distribute oil to the cooperating way surfaces irrespective of any seepage of contaminating aqueous coolant. Likewise, the treated felt pads retain their natural resilience for extremely long periods of time and are not adversely affected by the presence of contaminating aqueous coolant. As a consequence, scoring of the bearing way surfaces is obviated either due to a lack of lubricant or due to hardening of the felt pads themselves.

The improved silicone impregnated felt wiper pads are shown for illustrative purposes as being utilized to supply lubricant to the cooperating, vertical bearing way surfaces presented by the column 9 and knee 17. It will be apparent, however, that the improved, treated lubricant distributing wiper pads can be applied with equal facility and improved results to the similar bearing way surfaces between the table 15 and saddle 16, between the saddle 16 and knee 17 and between the spindle head 10 and column 9. Likewise, similar treated wiper pads can be used to supply lubricant to rotatable bearings.

Figures 4, 5:
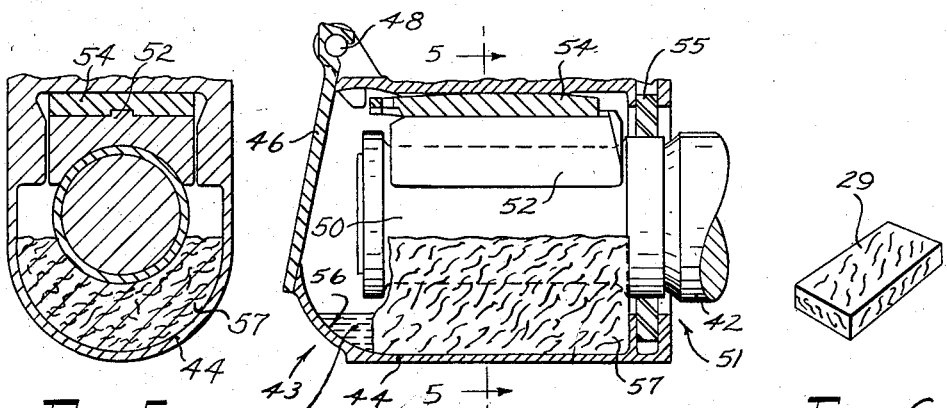
Fig. 4 is a view partly in vertical section and partly in side elevation through a journal box for a railway car and showing a modified form of the invention.
Fig. 5 is a view in transverse vertical section through the railway journal and taken generally along the lines 5—5 in Fig. 4; and, Fig. 6 is a view in perspective of a lubricant distributing pad.
Figure 6:
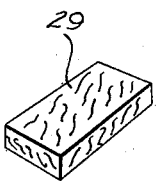

A modified form of the invention is shown in Fig. 4, illustrating diagrammatically a rotatable support bearing for a railway car axle 42 disposed to function under extremely adverse operating conditions. As there shown, a journal box 43 for a railway car axle comprises a hollow housing 44 having an opening at one end that is covered by a hinged protective cover 46 for convenience of access in repacking the bearing. The cover 46 is pivotally supported by a pin 48 secured at its opposite ends to the housing 44 and is normally biased to a closed position by means of a spring (not shown). The enlarged inner end of the axle 42 is adapted to carry a railway car wheel (not shown). The axle 42 is provided with a journal 50 of reduced diameter that extends through an enlarged end opening 51 in the housing 44 to engage a bearing or "brass" 52. A rocker plate wedge 54 and lateral abutments, Fig. 5, integrally formed with the opposite inner side housing walls constrain the bearing "brass" 52 for slight movement within the housing. The under side of the bearing "brass" 52 is provided with the usual arcuately fashioned bearing liner (not shown) disposed to engage the periphery of the axle journal 50. The aforedescribed constructional features of a journal box for a railway car axle are well known, and usually include a dust shield 55 removably fitted within the inner end of the housing 44 to protect the journal against outside contaminants, either liquids or solid particles.

To lubricate the mating portions of the bearing 52 and axle journal 50, lubricating oil 53 in a sump 56 formed within the housing 44 is disposed to saturate a chemically treated "waste" material 57 that acts as an oil wick to lubricate the axle journal. The "waste" material 57 comprises intermixed lengths of strands of fiber that absorb lubricating oil, and, by capillary action, transmit it to the journal 50, and thence to the arcuate mating surface of the bearing 52. It will be apparent that a greatly enlarged resilient felt wiper pad (not shown) of a size adequate to engage the journal 50 may be used instead of the "waste" material 57. Prior to being "packed" within the housing 44, the "waste" material 57 is treated to repel aqueous contaminants, by immersing it completely in a solution of silicones in a manner similar to that described for the felt wiper pads. After being removed from the silicone solution, the treated "waste" material 57 is packed within the housing 44, as shown in Fig. 4, and the sump therein is filled with lubricating oil.

The silicone impregnated "waste" repels aqueous contaminants, that may result from condensation within the housing 44, or that may seep into the housing in spite of the dust shield 55. By repelling aqueous contaminants, the treated waste 57 retains its resilience and continues to supply oil to lubricate the journal bearing.

Heretofore, aqueous contaminants could cause hardening of the "waste," thus preventing proper lubrication and contributing to the occurrence of "hot box" difficulties. A "hot box" could be created whenever a dried or hardened strand of untreated waste was frictionally engaged between the bearing surfaces, ignited by the friction and, in turn, igniting the remaining untreated waste material. Prevention of hardening by repelling aqueous contaminants enables the silicone treated "waste" 57 to retain its resilience, and precludes many of the "hot box" problems heretofore encountered in journals for railway cars.

From the foregoing description of the construction and operation of an illustrative lubricant distributor operating in accordance with the principles of this invention, it is apparent that there has been provided an improved lubricant distributor that operates to distribute lubricating oil to relatively movable bearing surfaces even under extremely adverse operating conditions.

Although the foregoing detailed description and the accompanying drawings are directed to particular apparatus exemplifying a preferred construction for the purpose of fully disclosing an operative embodiment of the invention, it is to be understood that the particular structures shown are intended to be illustrative only and that various features of the invention may be incorporated in other forms and constructions without departing from the spirit and scope of the invention as defined in the subjoined claims.

The principles of this invention having now been fully explained in connection with the foregoing description, I hereby claim as my invention:

1. In combination with a movable metallic bearing, a cooperating bearing having slidable engagement with said metallic bearing, said cooperating bearing requiring the introduction of lubricating oil to minimize friction, said bearings being arranged to operate in proximity to a contaminating aqueous fluid from an external source, and a felt lubricating pad adapted to repel aqueous fluid being carried in position to frictionally engage said movable bearing, said felt pad being treated with silicones in a manner to enable it to repeal aqueous fluid and render it permeable by lubricating oil, and a source of lubricating oil connected to saturate said pad with oil whereby said cooperating bearings are lubricated irrespective of the presence of aqueous fluid.

2. In a machine tool, an upright column presenting a way surface, a power driven tool spindle journalled in said column, a paid of slidably superimposed work supports carried by the way surface presented by said column in operative relationship to said tool spindle, said work supports being provided with complementary slidably engaged way surfaces, power driven means operatively connected to effect relative movement between said work supports, one of said work supports being adapted to carry a workpiece in operative relationship to a cutter carried by said spindle, a coolant supply system including a source of coolant operatively disposed to direct coolant toward a cutter and workpiece respectively carried by said spindle and said upper work support, overflow coolant from said supply system being partially discharged on an exposed way surface presented by said column, a felt wiper pad secured to one of said work supports in position to slidably engage the partially exposed way surface presented by said column, said felt wiper pad being treated with silicones in a manner that it repels aqueous coolant, and a source of lubricaating oil connected to distribute oil to the slidably engaged way surfaces presented by said support and said column in a manner that said pad is permeated by oil from said source.

3. In combination with a pair of relatively movable members presenting slidably engaged bearing surfaces, said members being arranged to operate in the presence of aqueous fluid from an external source, a silicone treated pad disposed to frictionally engage a bearing surface presented by one of said members, said pad being adapted to repel aqueous fluid and being permeable by lubricating oil, and a source of lubricating oil connected to saturate said pad with oil whereby lubricant is supplied to said cooperating bearing surfaces.

4. In a machine tool provided with a pair of relatively movable members presenting complementary bearing surfaces in slidable engagement, a water repellant felt pad secured to one of said members in a manner to frictionally engage the way surface presented by the other of said members, said pad being so treated as to repel aqueous solutions whereby it retains its resiliency and distributes lubricant over the way surface which it frictionally engages.

5. In a machine tool, a pair of relatively movable members presenting cooperating slidably engaged way surfaces, a lubricating system including a source connected to supply lubricant to the way surfaces presented by said members, a silicone impregnated felt wiper pad secured to one of said members in a manner to frictionally engage the way surface presented by the other of said members, and a lubricating system connected to supply lubricant to the way surfaces presented by said members in a manner that movement thereof causes said felt wiper pad to distribute lubricant along said frictionally engaged way surface.

6. In a bearing device, a housing provided with a lateral opening, a rotatable journal extending through said opening into said housing, an arcuate bearing carried within said housing disposed to frictionally engage said jounrnal, silicone treated waste material contained within said housing disposed to engage said journal, and a source of lubricating oil connected to supply oil to said silicone treated waste material whereby said waste material functions to transmit lubricating oil to said journal and said bearing irrespective of the presence of aqueous coolant.

7. In combination with a pair of members carried for relative movement, said members presenting bearing surfaces in frictional engagement, and means to effect relative movement between said members, a silicone treated lubricating pad engaging one of the bearing surfaces presented by one of said members, and a source of lubricating oil connected to saturate said silicone treated pad with oil for lubricating said bearing surfaces irrespective of the presence of aqueous fluid.

8. In combination with a first bearing, a cooperating bearing disposed to frictionally engage said first bearing, said bearing being carried for relative movement in proximity to a source of contaminating aqueous fluid, a felt pad impregnated with silicones disposed to engage one of said bearings, and a supply of lubricating oil connected to saturate said silicone impregnated pad.

9. In combination with a member presenting a bearing way surface, a relatively movable silicone impregnated felt pad disposed to frictionally engage the bearing way surface presented by said member, and lubricating oil including a source connected to saturate said pad with oil.

10. In a journal box for rotatably supporting one end of a railway car axle, a housing, a rotatable axle journal extending into said housing, a bearing in said housing disposed to frictionally engage said axle journal, a silicone impregnated pad disposed to engage one of the cooperating bearing surfaces, and a supply of lubricating oil connected to saturate said silicone treated pad.

References Cited in the file of this patent
UNITED STATES PATENTS

| | | |
|---|---|---|
| 602,854 | Koch | Apr. 26, 1898 |
| 1,991,177 | Rutz et al. | Feb. 12, 1935 |
| 2,452,674 | Nenninger | Nov. 2, 1948 |

OTHER REFERENCES

Silicones and Their Uses, published by McGraw-Hill Book Co. Inc. (Pages 83 to 86 relied upon.)